United States Patent [19]

Luplow

[11] Patent Number: 5,339,461
[45] Date of Patent: Aug. 16, 1994

[54] COMPACT RADIO FREQUENCY RECEIVER HAVING TAKE-UP SPOOL HOUSED EARPHONE CONDUCTORS

[76] Inventor: Harley M. Luplow, 300 Woodridge, Bloomfield Hills, Mich. 48304

[21] Appl. No.: 762,758

[22] Filed: Sep. 20, 1991

[51] Int. Cl.⁵ ............................................. H04B 1/08
[52] U.S. Cl. ................................... 455/351; 455/90; 439/4; 242/385
[58] Field of Search ............... 455/347, 349, 350, 351, 455/89, 90; 379/438; 439/4; 242/107.6

[56] References Cited

U.S. PATENT DOCUMENTS

| | | | |
|---|---|---|---|
| 3,798,389 | 3/1974 | Tokizaki | 179/101 |
| 3,984,645 | 10/1976 | Kresch | 179/156 A |
| 4,485,278 | 11/1984 | Schaller | 439/4 X |
| 4,682,363 | 7/1987 | Goldfarb et al. | 455/351 |
| 4,691,383 | 9/1987 | DeMars | 455/351 |
| 4,942,617 | 7/1990 | Boylan | 381/182 |
| 5,074,863 | 12/1991 | Dines | 242/107.6 X |
| 5,178,619 | 1/1993 | Galazaka | 242/107.6 X |

Primary Examiner—Reinhard J. Eisenzopf
Assistant Examiner—Philip J. Sobutka
Attorney, Agent, or Firm—48303; Harness, Dickey & Pierce

[57] ABSTRACT

A compact, radio frequency receiver apparatus having left and right channel conductors windably disposed within a housing of the apparatus. The left and right channel electrical conductors each further have earphone transducers electrically coupled thereto. The earphone transducers may be manually, removably stored in a plurality of recesses formed in an external surface of the housing. The conductors are windably disposed on a spool within the housing of the apparatus, with the spool being rotatable freely therewithin. A spring operatively associated with the spool exerts a constant biasing force in a rewind direction to tend to constantly urge the spool in the rewind direction. A latching member, manually movable by a user via a pushbutton release member, holds the spool stationary after the conductors have been unwound from the spool an approximate, desired length. The conductors are operatively associated with an FM stereo receiver/amplifier housed on a printed circuit board within the housing of the apparatus. Controls for allowing a user to manually adjust the volume and frequency of the signal received by the FM stereo receiver and amplifier are also provided. In an alternative preferred embodiment the apparatus includes an electrical coupling jack and associated conductor for coupling the apparatus to an independent, external FM stereo receiver unit. The coupling jack may also be removably stored within a recess in the external surface of the housing.

1 Claim, 6 Drawing Sheets

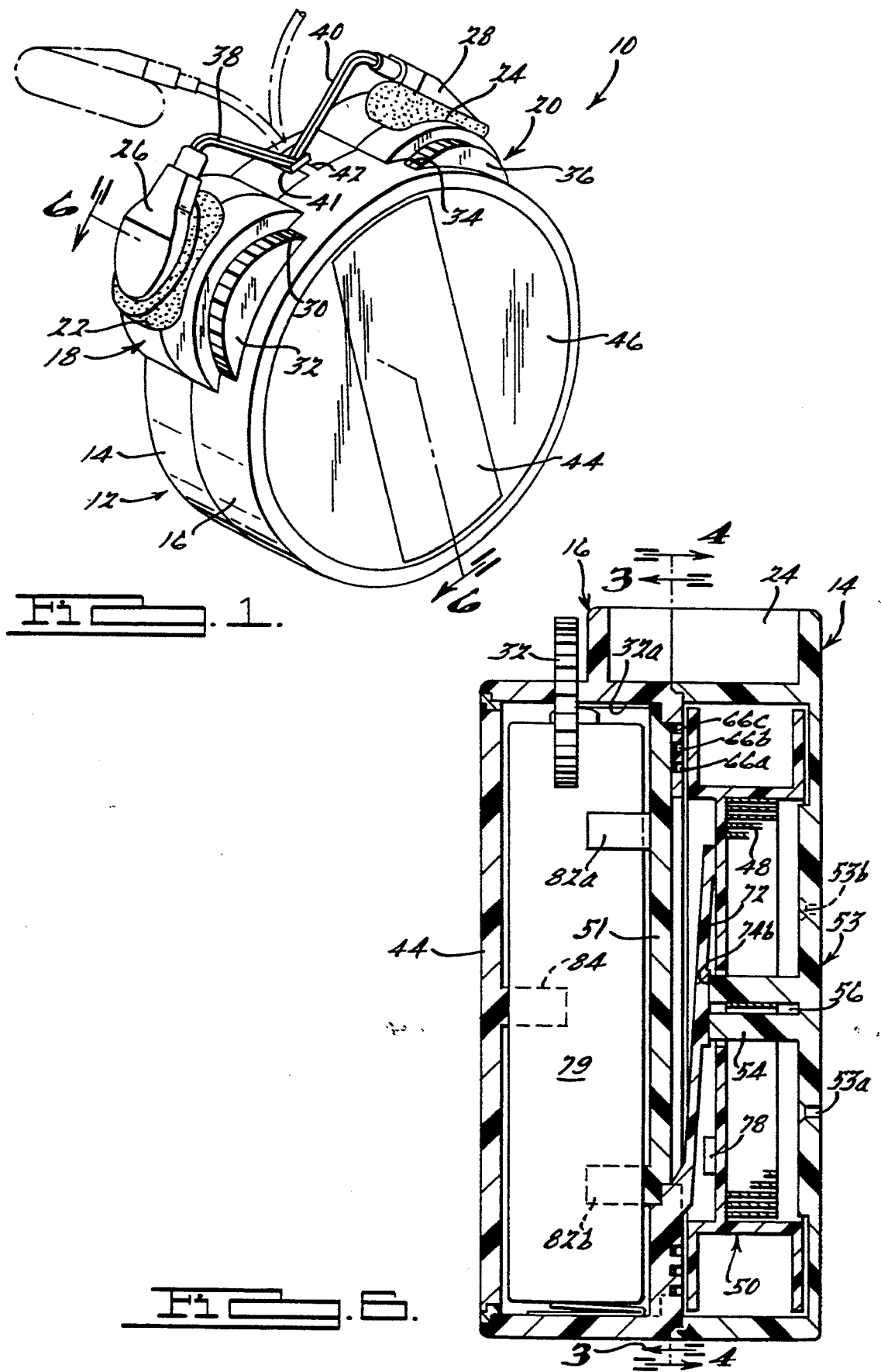

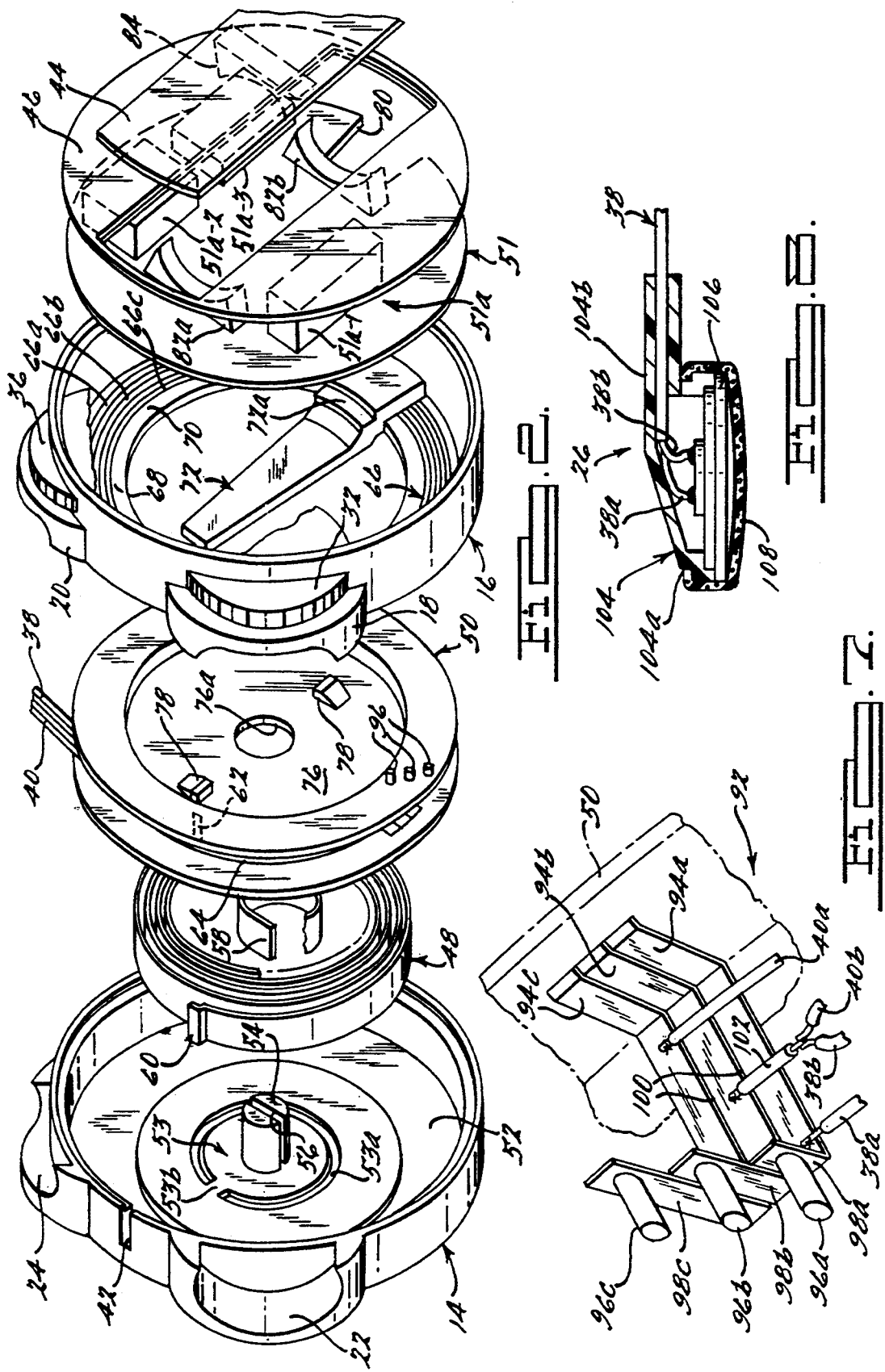

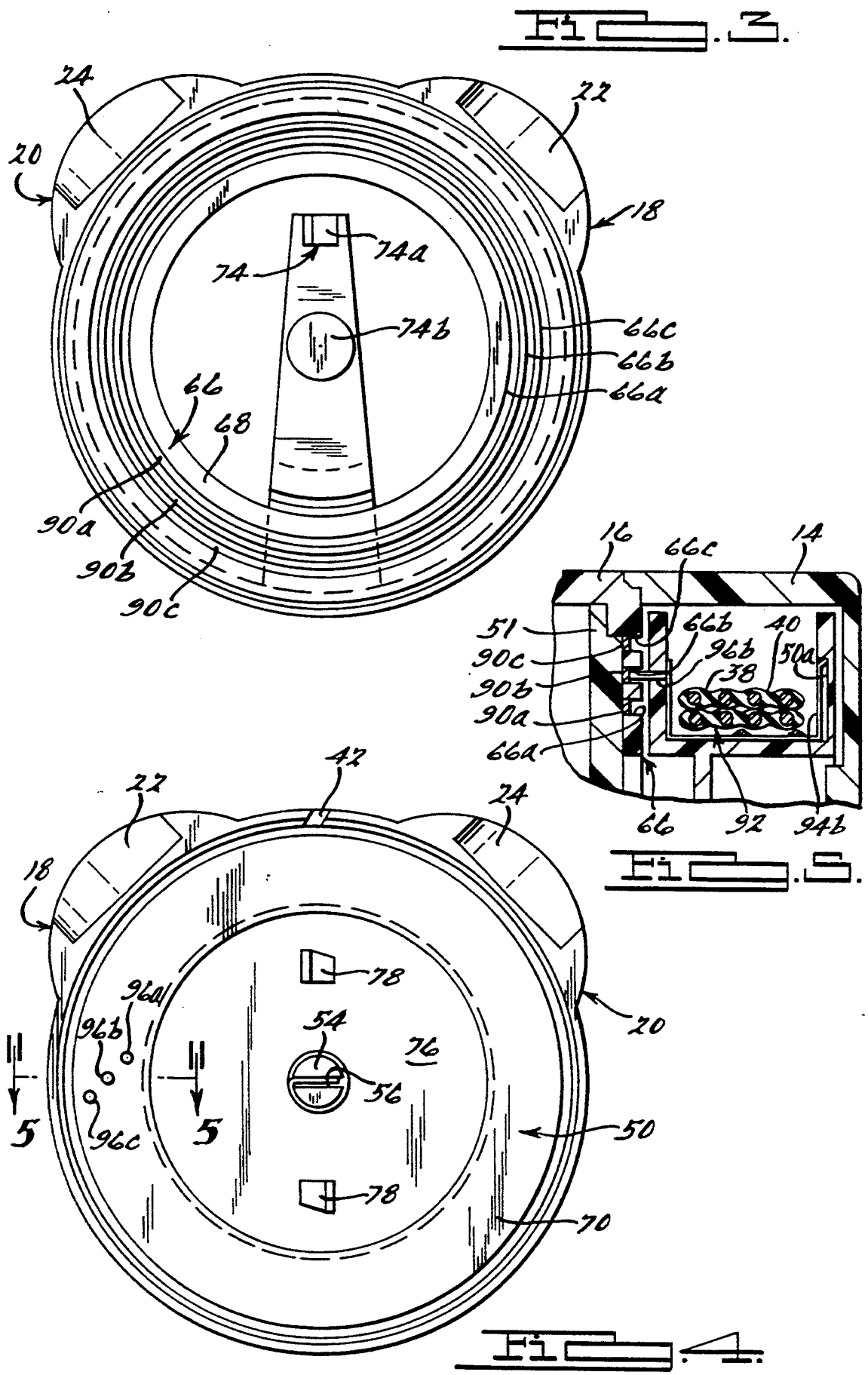

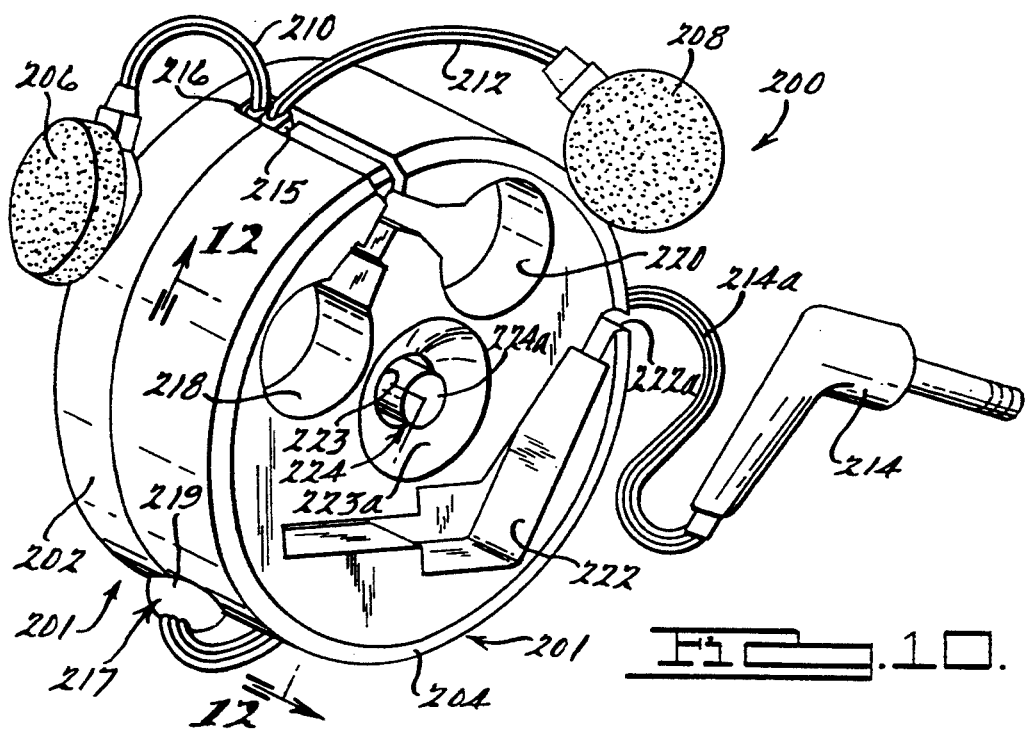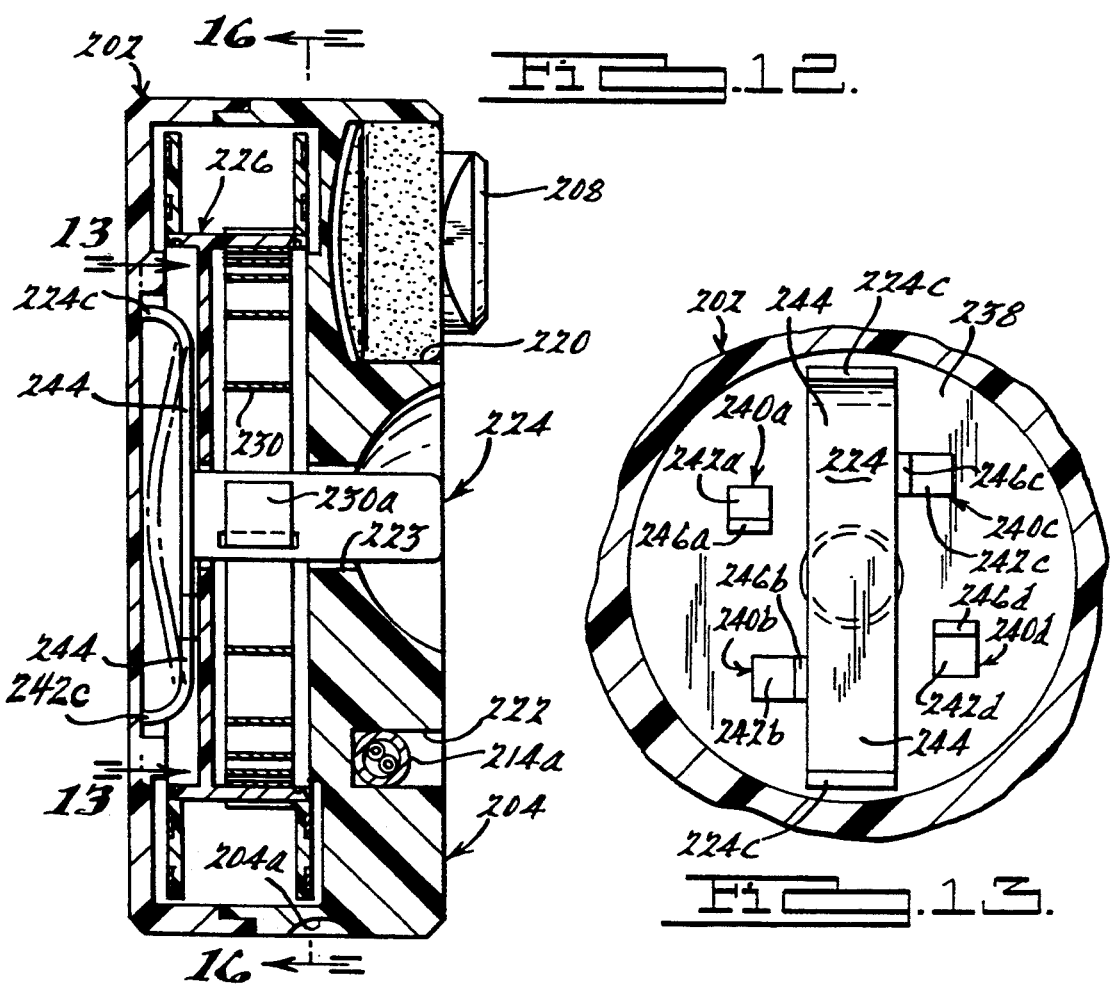

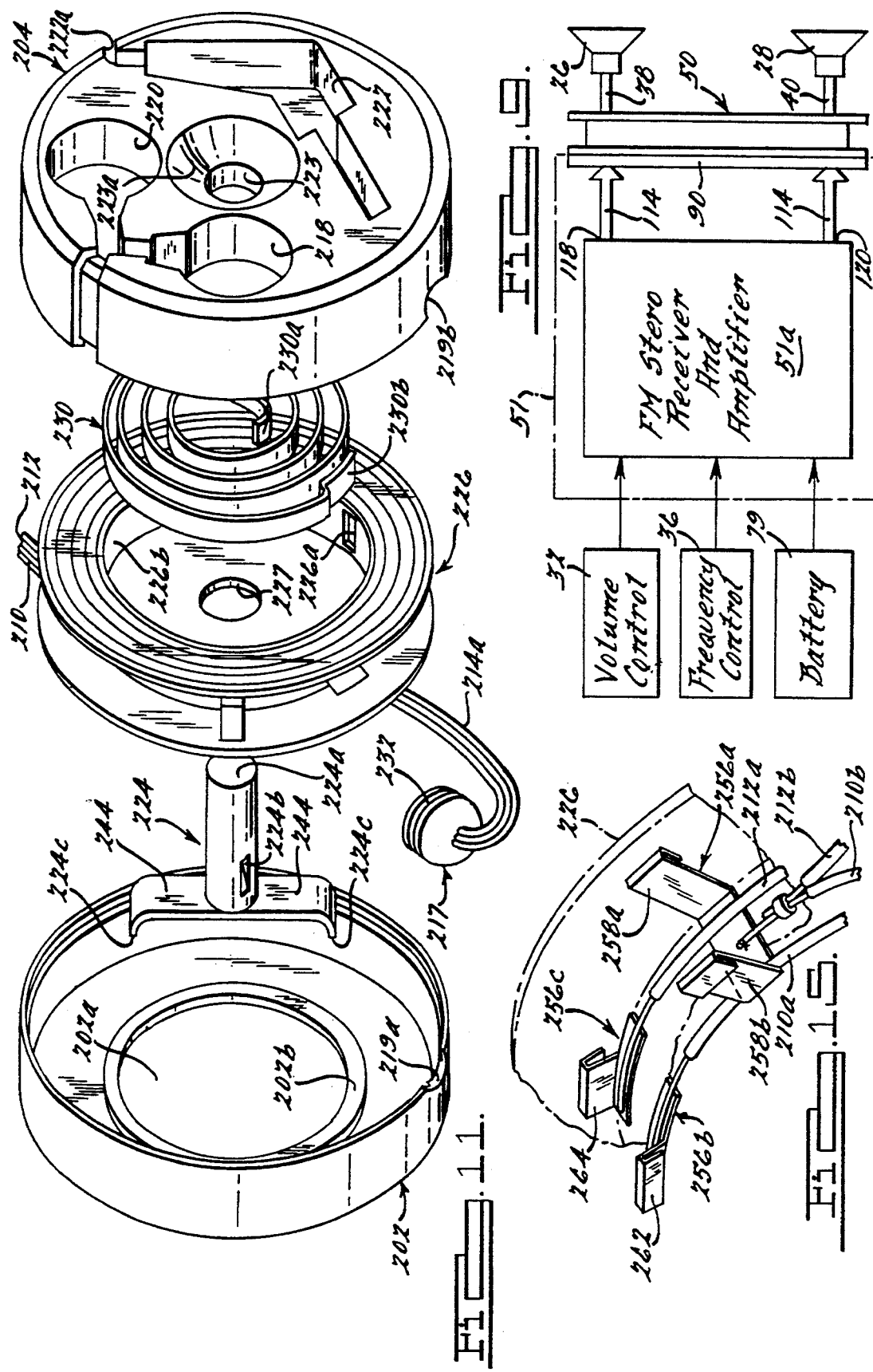

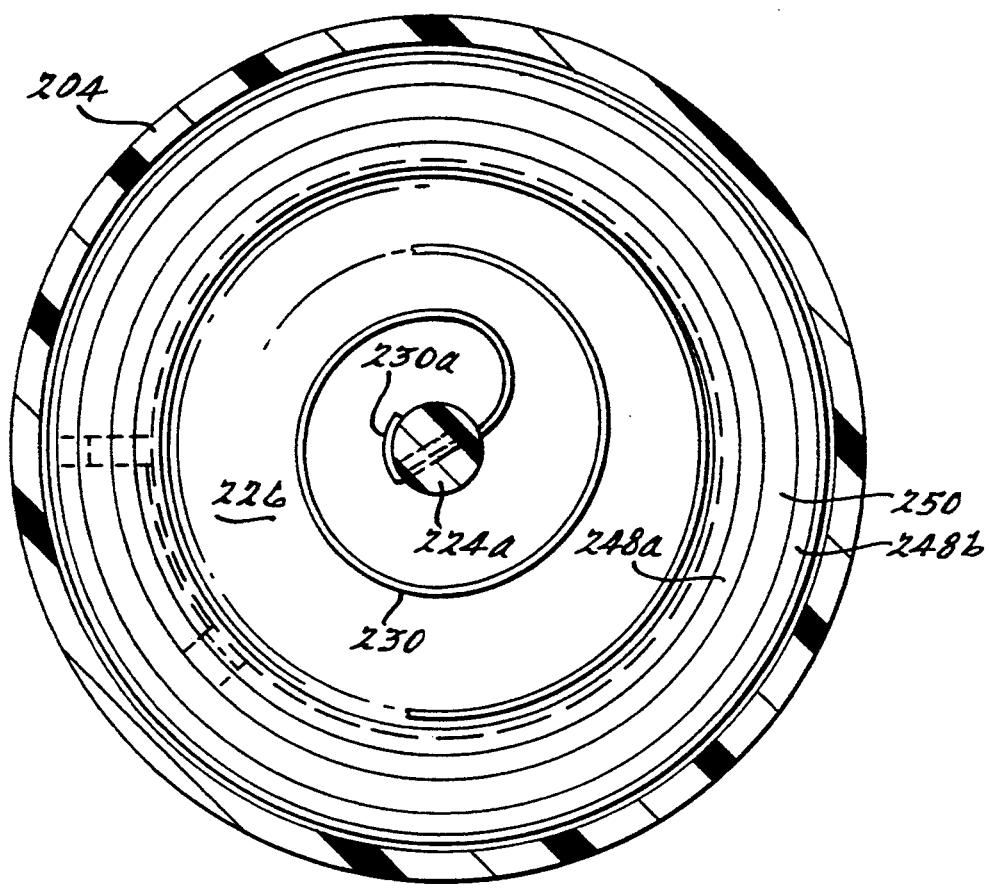
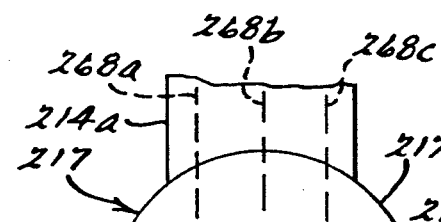
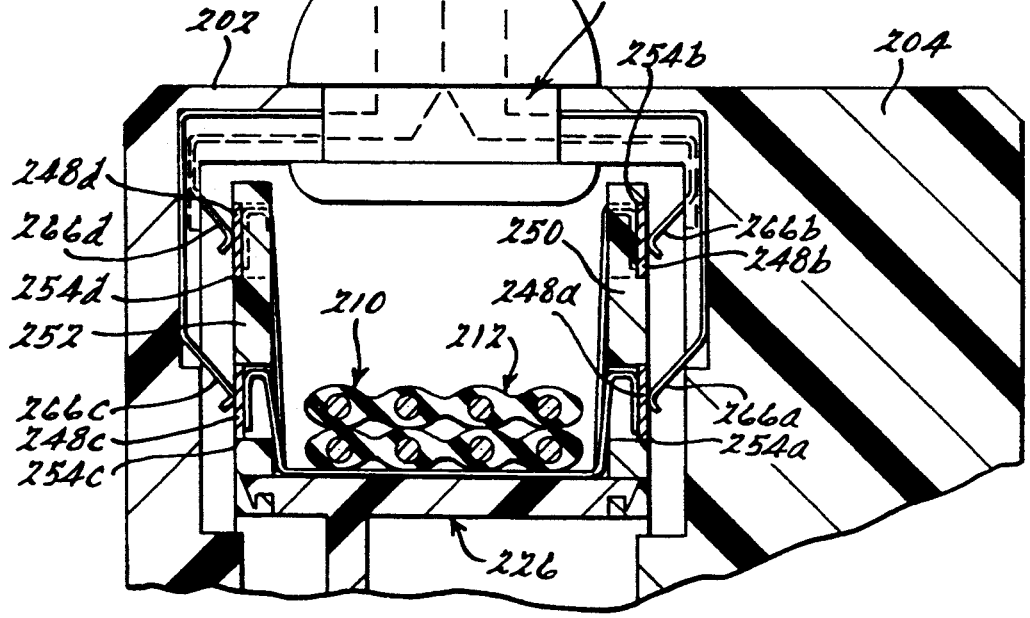

COMPACT RADIO FREQUENCY RECEIVER HAVING TAKE-UP SPOOL HOUSED EARPHONE CONDUCTORS

BACKGROUND OF THE INVENTION

1. Technical Field

This invention relates to compact, portable radio frequency receivers, and more particularly to a compact, portable FM stereo receiver incorporating a pair of earphone transducers coupled to independent electrical conductors, where the conductors are woundably disposed on a take-up spool within a compact housing when not in use.

2. Discussion

Portable stereo equipment is presently becoming ever popular. In particular, stereo equipment adapted to be easily carried by a person such as in a pants pocket, on a belt or waistband of pants or shorts is becoming particularly popular. Such equipment enables individuals to carry the equipment easily and comfortably while working or when performing exercise and leisure activities such as walking, jogging, bicycling, cross-country skiing, etc. Such equipment significantly enhances the enjoyment of many work, leisure and exercise activities and, due to the lightweight of such equipment, does not impede performance of these activities.

Presently available, compact, lightweight stereo receivers often incorporate some type of headphone or earphone apparatus which is coupled to an independent stereo receiver unit via independent left and right channel electrical conductors. The conductors often vary widely in length but are typically of a length of at least about 2 feet to enable the stereo receiver unit to be worn comfortably at the waistline of a user, while still providing enough slack in the left and right channel conductors when the attached headphones are being worn during exercise or leisure activities.

With such heretofore developed systems, no practical means has been devised for compactly and efficiently storing the electrical conductors which couple the stereo receiver unit and the headphone or earphones of the apparatus when the headphones or earphones of the apparatus are not being used. Accordingly, prior art apparatuses usually require the user to manually wind the left and right channel conductors around the stereo receiver unit, or around the headphones of the apparatus, or simply to wind the electrical conductors themselves into a compact form.

As constantly manually winding and manually unwinding the left and right channel conductors becomes, for many individuals, too cumbersome and inconvenient an operation to perform before and after each use of the apparatus, many individuals forego neatly winding up the left and right channel conductors after using the apparatus. This, however, makes the apparatus somewhat more inconvenient to transport and store when not in use. In addition, the left and right channel conductors and headphones or earphones can become tangled easily, and be damaged more easily.

Accordingly, it is a principal object of the present invention to provide a compact, lightweight and portable stereo receiver apparatus which is particularly well adapted to be carried in the pocket or on the waistband of clothing of a users or possibly secured to a collar or headband via a conventional clip, and which includes independent left and right channel conductors which are automatically wound upon a spool of a housing of the apparatus and stored neatly and efficiently within the housing when the apparatus is not in use.

It is still a further object of the present invention to provide a compact, lightweight stereo receiver unit which includes an FM stereo receiver completely housed within a compact housing, and which also includes within the housing a spool for enabling a pair of left and right electrical channel conductors leading to independent earphone transducers to be neatly, efficiently and automatically wound thereupon when the apparatus is not in use.

It is yet another object of the present invention to provide a compact, lightweight earphone transducer apparatus which may be easily and conveniently carried in a pocket or on the waistband or shorts of a user, and which includes a pair of independent earphone transducers coupled to independent left and right channel conductors, where the channel conductors are automatically, neatly and efficiently wound upon a spool within a housing of the apparatus when the apparatus is not in use, and which further includes an electrical coupling jack for coupling the apparatus with an independent stereo receiver unit.

It is yet another object of the present invention to provide an earphone transducer apparatus which is compact, lightweight, and which includes a housing adapted to removably house a pair of earphone transducers and an electrical coupling jack when these items are not in use.

SUMMARY OF THE INVENTION

The above and other objects are provided by a compact, lightweight, radio frequency receiver apparatus in accordance with preferred embodiments of the present invention. The apparatus generally comprises a housing means having a radio frequency receiver container therein; spool means rotatably mounted within the housing means, a plurality of electrical conductors woundably disposed upon the spool means and operable to be manually unwound through an opening in the housing means by a user of the apparatus; and biasing means for providing a biasing force for rotating the spool means in a rewind direction. Release means are also disclosed for enabling a user of the apparatus to initiate the rewinding of the electrical conductors onto the spool means.

In a preferred embodiment of the invention a pair of earphone transducers are coupled to the electrical conductors and are removably housed within recessed portions in the housing means. Manually adjustable amplitude and frequency controls are further incorporated to enable a user to adjust the volume of an audio signal being generated by the earphone transducers and the frequency of the radio frequency signal being monitored by the receiver.

The apparatus forms an extremely compact, lightweight and easy to carry device which is particularly well-suited for carrying on the person of an individual while the individual is undertaking work activities or exercise or leisure activities such as walking, jogging or bicycling.

When using the apparatus of the present invention, a user merely manually draws out the conductors from the spool means to an approximate, desired length. The earphone transducers are then placed in or closely adjacent the ears and the radio frequency receiver means may be turned on via a switch accessible from the out-side of the housing means. When the user is done using the apparatus, depressing the release means enables the biasing means to rotate the spool means in the rewind direction to rewind the conductor means upon the spool means. Accordingly, when the apparatus is not in use the conductors are neatly and conveniently stored within the housing means. The earphone transducers may then be removably placed in the recessed portions of the housing means.

In an alternative preferred embodiment of the present invention, an earphone assembly housing apparatus operable to be removably coupled with an independent radio frequency receiver unit is provided. This embodiment generally comprises a housing means having a plurality of recessed portions on an outer surface thereof; spool means rotatably mounted within the housing means; a plurality of conductor means woundably disposed upon the spool means and manually unwindable therefrom via an opening in the housing means; and biasing means for providing a biasing force operable to rotate the spool means in a rewind direction. Means are also included for holding the spool means stationary after the conductor means has been unwound to an approximate, desired length.

Further included is a pair of earphone transducers coupled to the conductor means for generating audio signals in accordance with electrical signals transmitted through the conductor means; electrical coupling means for coupling the conductor means to the independent radio frequency receiver unit; and manually controllable release means for cooperating with the means for holding the spool stationary to thereby enable the biasing means to urge the spool means rotatably in the rewind direction after use of the apparatus.

In one form of the alternative preferred embodiment mentioned above, the earphone transducers may be placed in the recessed portions in the outer surface of the housing means after the electrical conductors have been rewound upon the spool means. In this form of the alternative preferred embodiment the electrical coupling means comprises an electrical coupling jack which may also be removably stored within one of the plurality of recessed portions in the outer surface of the housing means. Accordingly, this form of the alternative preferred embodiment provides a compact, lightweight and conveniently stored earphone assembly housing apparatus which may be quickly and easily coupled to an independent, remote radio frequency receiver system such as a portable, FM stereo receiver unit, or alternatively a home stereo system, or virtually any stereo or radio frequency device having a conventional coupling jack.

The preferred embodiments of the present invention all provide a compact, lightweight and easy to use earphone transducer or earphone transducer/radio frequency receiver apparatus which may be conveniently carried or stored in a pants or shirt pocket. The preferred embodiments of the present invention further enable the electrical conductors leading to the earphone transducers to be neatly and efficiently wound upon a spool and stored internally in a housing when not in use, thus alleviating the need for the user to manually wind-up or coil the conductors after every use.

Other objects, advantages and features of the present invention will become apparent to one skilled in the art upon reading the following description and claims, taken in conjunction with the following drawings.

BRIEF DESCRIPTION OF THE DRAWINGS

The various advantages of the present invention will become apparent to one skilled in the art by reading the following specification and subjoined claims and by referencing the following drawings in which:

FIG. 1 is an elevational, perspective view of a compact, earphone transducer/FM stereo apparatus in accordance with a preferred embodiment of the present invention;

FIG. 2 is an exploded perspective of the various components of the apparatus of FIG. 1;

FIG. 3 is an elevational view of the apparatus of FIG. 1 in accordance with section line 3—3 in FIG. 6;

FIG. 4 is an elevational view of the apparatus of FIG. 1 in accordance with section line 4—4 in FIG. 6;

FIG. 5 is an enlarged, fragmentary, cross-sectional view of a portion of the apparatus in accordance with section line 5—5 of FIG. 4.

FIG. 6 is a side cross-sectional view of the apparatus of FIG. 1 in accordance with section line 6—6;

FIG. 7 is an elevational perspective view of an electrical coupling member of the apparatus of FIG. 1;

FIG. 8 is a cross-sectional view of one earphone transducer of the apparatus of FIG. 1;

FIG. 9 is a simplified schematic representation of the electrical connections of various components of the apparatus of FIG. 1;

FIG. 10 is an elevational perspective view of an earphone assembly housing apparatus in accordance with an alternative preferred embodiment of the present invention;

FIG. 11 is an exploded perspective view of the apparatus of FIG. 10;

FIG. 12 is a sectional view of the apparatus of FIG. 10 in accordance with section line 12—12 in FIG. 10, and also showing one of the earphone transducers removably mounted within a recess of the housing;

FIG. 13 is a fragmentary end view of the apparatus of FIG. 12 in accordance with section line 13—13 in FIG. 12;

FIG. 14 is an enlarged, fragmentary cross-sectional illustration of a portion of the apparatus of FIG. 12;

FIG. 15 is a fragmentary, elevational, perspective illustration of a portion of the spool of the apparatus showing the electrical coupling elements thereof; and FIG. 16 is a cross-sectional end view of the apparatus of FIG. 12 in accordance with section line 16—16 in FIG. 12.

DETAILED DESCRIPTION OF THE PREFERRED EMBODIMENTS

Referring to FIG. 1, an earphone transducer/FM stereo receiver apparatus 10 is illustrated in accordance with a preferred embodiment of the present invention. The apparatus generally comprises a housing 12 having generally circular, mating spindle and ratchet housing sections 14 and 16 respectively. The housing sections 14 and 16 cooperatively form ear portions 18 and 20 having recesses 22 and 24 respectively for removably housing independent left and right channel earphone transducers 26 and 28 respectively.

The ratchet housing section 16 further includes an elongated aperture 30 for enabling a manually controllable, rotary thumbwheel volume control 32 to partially protrude outwardly thereof. A second, elongated aperture 34 on the ratchet housing section 16 enables a manually controllable, rotary thumbwheel frequency tuning control 36 to partially protrude outwardly thereof. The volume control 32 enables a user to manually adjust with one finger the volume of an audio signal provided by earphones 26 and 28. The frequency control 36 enables the user to select a desired radio frequency to be monitored.

With further reference to FIG. 1, the earphones 26 and 28 are electrically coupled to independent left and right channel conductors 38 and 40. The conductors 38 and 40 are removably, woundably disposed within the housing 12 and may be manually unwound outwardly of the housing 12 through a slot 42 in the spindle housing section 14. A slidable member 41 is disposed over the conductors 38 and 40 and helps hold the endmost ten to twelve inches of the conductors 38 and 40 together as they are being wound up within the housing 12. The housing sections 14 and 16 may be secured together via adhesives or other well known means of attachment.

The ratchet housing section 16 further includes a removable battery panel member 44 removably disposed within a generally circular outer housing member 46 coupled to the ratchet housing section 16. Battery panel member 44 enables a battery to be conveniently inserted and removed from the housing by a user as needed. The battery panel member 44 may be removably coupled via well known locking shoulder/tab type arrangements.

Referring now to FIG. 2, a more detailed illustration of the various components of the apparatus 10 is provided. The apparatus 10 further comprises a flat coil spring 48, a generally circular spool 50 upon which a major portion of the length of conductors 38 and 40 is wound upon, and a printed circuit board 51, all generally concentrically disposed within the spindle and ratchet housing sections 14 and 16 respectively. The spindle housing section 14 further includes an inner surface 52 having a pushbutton like release member 53 formed via a generally circular cut-out 53a and connecting portion 53b. Release member 53 has a spindle portion 54 protruding outwardly therefrom. The spindle portion 54 includes a slot 56 through which an angled end portion 58 of the flat coil spring 48 is inserted. The flat coil spring 48 includes an outer angled end portion 60 which is further disposed within a slot 62 in a surface portion 64 of the spool 50. Thus, as the spool is rotated clockwise when viewing FIG. 2, the spring 48 exerts a constant, counter-acting biasing force in the counter-clockwise direction which attempts to urge the spool 50 rotatably in a counter-clockwise, or rewind, direction.

With further reference to FIG. 2, the ratchet housing section 16 includes an internal shoulder portion 66 having a plurality of arcuately shaped slots 66a, 66b and 66c, an inner surface 68 and an outer surface 70. A ratchet member in the form of an elongated ratchet arm 72 having a base member 72a is integrally formed with the shoulder portion 66 and is somewhat flexible to enable it to be urged slightly outwardly of the outer surface 70. The ratchet arm 72 includes a shoulder portion 74 having an angled portion 74a and a round protruding tab member 74b, as shown in FIG. 3, and holds the spool 50 normally stationary against the biasing force generated by the flat coil spring 48.

With still further reference to FIG. 2, the spool 50 further includes a central wall portion 76 having an aperture 76a and angled tab members 78 protruding therefrom. The aperture 76a receives the spindle portion 54 and enables the spool 50 to rotate about the spindle portion 54.

With reference to FIGS. 3 and 4, The angled tab members 78 cooperate with the shoulder portion 74 and angled portion 74a thereof to enable the shoulder portion 74 to abuttingly engage one or the other of the tab members 78. This enables the ratchet arm 72 to hold the spool 50 stationary after the spool has been rotated in an unwind direction (clockwise when viewing FIG. 2) a desired number of revolutions by drawing out the conductors 38 and 40 and then releasing the conductors 38 and 40.

With reference again to FIG. 2, to cause the spool 50 to be rotated in the rewind direction (counter-clockwise when viewing FIG. 2) when the spool 50 is being held against the biasing force of flat coil spring 48 by ratchet arm 72, the pushbutton release member 53 is manually urged inwardly relative to the ratchet arm 72 with a finger or thumb. This causes the spindle portion 54 to abuttingly engage the protruding tab member 74b on the ratchet arm 72, thus urging the ratchet arm 72 outwardly and away from one of the tab members 78 with which it is in abutting engagement. This in turn enables the spool 50 to rotate freely about spindle 54 in response to the counter-acting biasing force of flat coil spring 48, thereby enabling spring 48 to rotate the spool 50 in the rewind direction until the conductors 38 and 40 are almost completely wound thereupon.

With still further reference to FIG. 2, the printed circuit board 51 of the present invention 10 can be seen to fit nestably within the ratchet housing section 16 against outer surface 70. The printed circuit board 51 includes an FM stereo receiver/amplifier circuit 51a mounted thereon, which generally comprises an FM stereo receiver chip 51a-1, an FM stereo decoder chip 51a-2 and an audio amplifier chip 51a-3. These components are available from the Philips Corporation under part numbers TDA702IT, TDA704TO and TDA70-5TO respectively. The printed circuit board 51 further includes a notched portion 80 which fits over the base portion 72a of the ratchet arm 72 when assembled within the ratchet housing section 16.

A pair of semi-circular battery mounting member 82a and 82b are also included which work cooperatively with a complementarily shaped battery mounting member 84 disposed on an inner surface of the battery panel member 44. The battery mounting members 82a, 82b and 84 cooperatively hold a cylindrical battery 79 (shown in FIG. 6), such as a conventional "AAA" battery cell, removably and securely within the housing 12. The housing sections 14 and 16, spool 50, battery panel member 44 and outer housing member 46 are all preferably injection molded from suitable plastic.

Referring now to FIGS. 3 and 5, the inner surface 68 of shoulder portion 66 of the ratchet housing section 16 with the printed circuit board 51 coupled thereto can be seen more clearly. With specific reference to FIG. 5, the printed circuit board 51 includes a plurality of generally circular metallic conductor rings 90a, 90b and 90c arranged concentrically about an axial center of the printed circuit board 51 and electrically coupled to outputs of the FM stereo receiver/amplifier circuit 51a. The conductor rings 90 are arranged to align vertically with arcuately shaped slots 66a, 66b and 66c to thus enable the conductor rings 90 to project partially into the slots 66a, 66b and 66c.

With reference to FIGS. 5 and 7, a generally U-shaped, metallic, electrical coupling member 92 is shown. Referring specifically to FIG. 7, the coupling member 92 includes retaining portions 94a, 94b and 94c, a plurality of electrical contact elements 96a, 96b and 96c protruding transversely outwardly of independent, associated conductive members 98a, 98b and 98c, which are electrically insulated from each other via independent insulating strips 100. The retaining portions 94a, 94b and 94c are formed so that they exert a slight outward biasing force to engage within a recess 50a in the spool 50 (shown in FIG. 5), to help hold the coupling member 92 securely to the surface portion 64 (shown in FIG. 2) of the spool 50.

With continuing reference to FIG. 7, conductive member 98a is electrically coupled via conventional soldering, crimping or a snap-fitted insertion, to a non-grounded conductor 38a of left channel conductor 38. A non-grounded conductor 40a of the right channel conductor 40 is similarly secured to the conductive member 98c. The grounded conductors 38b and 40b of the left and right channel conductors 38 and 40 respectively are electrically coupled together before being coupled to the conductive member 98b via a short section of coupling wire 102. The non-grounded conductors 38a and 40a and coupling conductor 102 are each preferably soldered, crimped or snap fitted to the conductive members 98a–98c to enable current flow between them and their associated conductor elements 96a–96c. In a preferred form the conductors 38 and 40 are comprised of a single length of well known, four conductor ribbon cable. The ribbon cable form is preferable because it enables the conductors 38 and 40 to be neatly, easily and efficiently wound upon and unwound from the spool 50 during use of the apparatus 10.

As illustrated in FIG. 5, when assembled, the contact element 96b protrudes partially into slot 66b in the shoulder portion 66 of the ratchet housing section 16. Contact elements 96a and 96c similarly protrude partially into slots 66a and 66c respectively. Each of the contact elements 96a–96c make independent contact with the conductive rings 90a–90c to enable continuous, independent, electrical connections to be made between the conductors 38 and 40 and the fixedly disposed printed circuit board 51. Accordingly, electrical signals may be supplied via the FM stereo receiver/amplifier 51a to the left and right channel conductors 38 and 40 after the conductors have been unwound a desired length off of the spool 50.

The assembled apparatus 10 can also be seen in the drawing of FIG. 6. In FIG. 6, it can also be seen how the printed circuit board 51 and spool fit compactly within the housing sections 14 and 16. It can also be seen how pressing upon the release member 53 operates to urge the ratchet member 72 away from the spool 50, thus initiating the rewinding of the conductors 38 and 40 (not shown) thereupon if the conductors have been previously unwound therefrom.

With regard to the thumb wheel volume control 32, and frequency control 36 (not shown), these components are preferably physically mounted and electrically coupled to the printed circuit board 51 and comprise conventional, detachable thumbwheel portions to enable assembly of the apparatus to be accomplished more easily. It should also be appreciated that well known and more expensive electrical digital pushbutton volume and frequency control devices could also be incorporated if so desired. These controls are also electrically coupled during assembly, preferably via contacts on the controls 32 and 36, with conductive circuit traces or other conductive elements such as independent conductor wires, one of which is illustrated as wire 36a, with the printed circuit board 51.

With reference now to FIG. 8, the left channel earphone transducer 26 is shown. The transducer 26 is of a well known construction and includes an outer housing section 104, a speaker element 106, and a section of foam covering 108 secured around a shoulder portion 104a of the outer housing section 104. The outer housing section 104 has a generally flat, slightly slanted back portion 104b which helps to maintain the compact profile of the apparatus 10 when the earphone transducer 26 is placed removably within recess 22. The construction of earphone transducer 28 is identical to earphone transducer 26, and thus will not be discussed.

To facilitate placement of the earphone transducers 26 and 28 in the recesses 22 and 24, respectively, the outer dimensions of the foam sections of each are preferably close to the dimensions of the recesses 22 and 24. This enables the earphone transducers 26 and 28 to be easily placed within the recesses 22 and 24 and yet to be reasonably securely held within the recesses 22 and 24 while the apparatus 10 is not in use.

With brief reference now to FIG. 9, a simplified schematic representation of the electrical connections of the apparatus 10 is provided. The volume control 32 and the frequency control 36 enable the user to control the level of the audio signal generated at the earphone transducers 26 and 28, as well as the frequency of the received signal. The volume control is preferably a combination volume/on-off control well known in the art. The FM stereo receiver/amplifier 51a, the volume control 32 and the frequency control 36, as well as the battery 79, are all electrically coupled to the printed circuit board 51. A plurality of independent conductive traces 114 embedded in the printed circuit board 51 electrically couple left and right channel outputs 118 and 120 of the FM stereo receiver/amplifier 51a to the conductor rings 90a–90c (FIG. 3 and 5). The antenna of the FM stereo receiver/amplifier 51a may consist of the ground conductors 38b and 40b of the conductors 38 and 40, as is well known in the art.

It is a principal advantage of the present invention that the conductors 38 and 40 of the apparatus 10 can thus be conveniently, neatly and easily rewound upon the spool 50 by simply depressing pushbutton release member 53, and the conductors 38 and 40 unwound from the spool 50 simply by manually drawing them outwardly of slot 42. The apparatus 10 eliminates the inconvenience of having to manually rewind the conductors 38 and 40 after each use. The apparatus 10 further enables the conductors 38 and 40 to be stored in a compact, lightweight housing and to be easily, manually withdrawn therefrom when desired. The compact, lightweight and overall construction of the apparatus 10 further enables it to be carried in a pant's pocket, shirt pocket or worn via a belt clip on a belt or waistband of a user's clothing. Alternatively, the apparatus could even be carried on a shirt collar or sweatband worn on the head if a conventional mounting clip is secured to the apparatus 10. Accordingly, many work, exercise and recreational activities may be carried out with even greater freedom of movement and enjoyment.

Referring now to FIG. 10, there is shown an earphone assembly housing apparatus 200 in accordance with an alternative preferred embodiment of the present invention. The apparatus 200 includes a housing 201 having spindle and ratchet housing sections 202 and 204, respectively, left and right earphone transducers 206 and 208 electrically coupled to left and right channel conductors 210 and 212, respectively, and a well-known, conventional electrical coupling jack 214 electrically coupled to a relatively short length of a conductor 214a. A slidable member 215 is further included and circumscribes the conductors 210 and 212 to aid in holding the endmost ten to twelve inches of conductors 210 and 212 together as they are retracted into the housing 201. Conductor 214a is further electrically coupled to a grommet-like electrical coupling assembly 217, which is secured within an aperture 219 formed by the housing sections 202 and 204. The ratchet housing section 204 includes a slot 216 through which the left and right channel conductors 210 and 212 may pass, thus enabling them to be manually withdrawn from an interior area of the apparatus 10 and retracted substantially thereinto when not in use.

The ratchet housing section 204 further includes a plurality of recesses 218 and 220 which are of a shade and depth to enable the earphone transducers 206 and 208 to be manually and securely placed therein when not in use. An aperture 223 is formed in a concave-shaped recess 223a in the ratchet housing section 204 through which a spindle portion 224a of a T-shaped spindle member 224 protrudes. The spindle portion 224a acts like a pushbutton release member to effect rewinding of the conductors 210 and 212 when pressed on with a finger or thumb. The ratchet housing section 204 further includes a recess 222 which is of a shape and depth in accordance with the shape and depth of jack 214 to enable the jack 214 to be placed manually and securely therein when not in use. Thus, when the apparatus 200 is not in use the earphone transducers 206 and 208 and the jack 214 may all be held easily, compactly and securely within their respective recesses 218, 220 and 222. When it is desired to use the apparatus 200, the earphone transducers 206 and 208 and jack 214 may be easily, manually removed from the ratchet housing section 204.

Referring now to FIG. 11, the internal construction of the apparatus 200 can be seen more clearly. Secured within the spindle and ratchet housing sections 202 and 204 is the T-shaped spindle member 224 having a slot 224b within spindle portion 224a, a takeup spool 226 having an aperture 227 through which spindle portion 224a passes, the electrical coupling assembly 217, and a flat coil spring 230 having an inner end portion 230a and an outer end portion 230b. The spool 226 is adapted to windably hold the conductors 210 and 212 thereon in a neat and efficient manner. The electrical coupling assembly 217 is adapted to be secured via a groove 232 between semi-circular cutouts 219a and 219b forming aperture 219 in the housing sections 202 and 204 respectively when the sections are assembled together. The spindle and ratchet housing sections 202 and 204, as well as at least a portion of the spool 226, are all manufactured from suitable plastic, preferably by injection molding.

The slot 224b of the T-shaped spindle member 224 is adapted to receive the inner end portion 230a of spring 230. The outer end 230b of spring 230 is received through a slot 226a in a base portion 226b of the spool 226. The spring 230 enables a constant counter-acting biasing force to be generated in a rewind direction, which is directed counter-clockwise when viewing FIG. 11.

As seen in FIGS. 12 and 13, and particularly in FIG. 13, an inside surface portion 238 of the spool 226 includes four raised shoulder portions 240a-240d. Each of the raised shoulder portions 240a-240d further includes an angled portion 242a-242d. Each of the angled portions 242a-242d is adapted to ride over locking surfaces 244 (FIGS. 11 and 12) of the T-shaped spindle member 224 as the spool 226 is rotated in an unwind (clockwise when viewing FIG. 13) direction against the biasing force of spring 230.

When the tension on the conductors 210 and 212 is released after the conductors 210 and 212 have been unwound from the spool 226 an approximate desired amount, the spool 226 is caused to begin to rotate in the rewind direction (counter-clockwise in FIG. 13) by the biasing force of the spring 230. Momentarily thereafter, at least one of the raised shoulder sections 240a-240d abuttingly engages, via a plurality of flat sides 246a-246d, one of the locking surfaces 244. This interrupts rotational rewind movement of the spool 226 and holds the spool 226 stationary against the biasing force of the spring 230.

As also seen in FIG. 12, a concave shaped recess 204a is formed in a portion of the ratchet housing section 204. Recess 204a extends circumferentially from aperture 219 and opens into a recess 222a (FIG. 1) to enable a short length, preferably about two to three inches, of conductor 214a to be wrapped around a portion of the ratchet housing section 204 when jack 214 is not is in use.

To cause the spool 226 to wind the conductors 210 and 212 thereon, the spindle 224 portion 224a is pressed inwardly relative to the spindle housing section 202. This causes the spindle 224 to be urged inwardly relative to the spindle housing section 202. A pair of edge portions 224c of T-shaped spindle member 224, in abutting engagement with an inner wall 202a of spindle housing section 202, cause the surfaces 244 to flex inwardly relative to the spindle housing section 202, as seen in FIG. 12. As surfaces 244 flex inwardly, the surface 244 moves out of abutting contact with the raised shoulder portion 240 which previously was holding it stationary. The biasing force generated by spring 230 then rotates the spool rapidly in the rewind direction. An annular shoulder 202b on the inner surface 202a of the spindle housing section 202 helps maintain the T-shaped spindle member 224 concentrically aligned therewith.

With reference to FIGS. 11, 14 and 16, it can be seen that the spool 226 includes a plurality of concentrically disposed, generally circular conductor rings 248a and 248b disposed concentrically on an outer shoulder portion 250 thereof. A pair of like conductor rings 248c and 248d are also disposed concentrically on an inner shoulder portion 252 of the spool 226. The conductor rings 248a-248d are preferably of a metallic material such as copper having good conductive characteristics. The conductor rings 248a-248d are further preferably etched in apertures 254a-254d during manufacture of the spool 226, as shown in FIG. 14. The shoulder portions 250 and 252 are preferably comprised of printed circuit board substrates which are snappingly or otherwise secured to the base portion 226b of the spool 226, to thereby help form the spool 226.

With reference now to FIG. 15, a plurality of electrical coupling elements 256a-256c of the present invention are illustrated. Element 256a is made from a conductive material such as copper and includes upwardly extending arm portions 258a and 258b. Each of the elements 256b and 256c further include shoulder portions 262 and 264 respectively. Element 256a is electrically coupled preferably via soldering or another like method of electrical attachment to a grounded conductor 210b of left channel conductor 210, which in turn is electrically coupled preferably via soldering or a crimp-on type connector to a ground conductor 212b of the right channel conductor 212. Elements 256b and 256c are each also coupled, for example, by soldering, to the non-grounded left and right channel conductors 210a and 212a respectively. Accordingly, each of the elements 256a, 256b and 256c are electrically isolated from each other and form independent paths through which electrical signals may be transmitted. Each of the elements 256a, 256b and 256c are further fixedly secured to the base portion 226b via adhesives or other conventional methods of attachment, and are adapted to enable the left and right channel conductors 210 and 212 to be wound thereover neatly and efficiently when the conductors 210 and 212 are not in use.

With reference again to FIG. 14, it can be seen that the ratchet housing section 204 includes a pair of conductor members 266a and 266b, while the spindle housing section 202 includes a similar pair of conductor members 266c and 266d. The conductor members 266a–266d preferably comprise metallic elements such as resilient copper members and may be molded into the housing sections 202 and 204 when the latter are constructed or, alternatively, secured within suitable notches in the housing sections 202 and 204, or secured by adhesives or other known means.

The conductor members 266a–266d are each electrically coupled via soldering, plug and jack assemblies, or any other well known means of electrical attachment to a non-grounded left channel conductor 268a, a ground conductor 268b and a non-grounded right channel conductor 268c of the conductor 214a, which is partially enclosed within a grommet-like member 217a of the electrical coupling assembly 217. The conductor members 266a–266d are further somewhat flexible and biased against the conductor rings 248a–248d respectively of the spool 226. Accordingly, a plurality of independent, electrically conductive paths are provided between each of the conductors 210a, 212a, and 210b and 212b, and conductors 268a–268c. Thus, electrical signals can be supplied through conductors 268a–268c to the left and right channel conductors 210 and 212 as the conductors 210 and 212 are unwound to varying lengths to accommodate the needs of a user of the apparatus 200.

When using the apparatus 200, a user may simply remove the electrical coupling jack 214 from its associated recess 222 and connect the jack 214 to an external, independent radio receiver unit, such as a battery-powered, portable, FM stereo receiver. The earphone transducers 206 and 208 may then be removed from their respective recesses 218 and 220, and their respective conductors 210 and 212 manually pulled outwardly of the housing 201 to an approximate, desired length. The earphone transducers 206 and 208, which are identical in construction to the earphone transducer 26 illustrated in FIG. 8, may each then be placed partially within the ears of the user.

When it is desired to rewind the earphone transducers 206 and 208 and their associated conductors 210 and 212, the spindle portion 224a may be manually depressed with a finger or thumb. This causes the spring 230 to immediately begin rewinding the conductors 210 and 212 neatly, quickly and efficiently upon the spool 226 until the earphone transducers 206 and 208 abuttingly engage slot 216 of the ratchet housing section 204. The electrical coupling jack 214 may then be placed in its recess 222. The apparatus 200 then forms a neat, compact and easily carried and stored means for containing earphones and conductors. and enabling a radio frequency signal from an output of an independent radio frequency receiver to be monitored by a user.

It should also be appreciated that the apparatus 200 could easily be coupled to a home stereo system, cassette tape player, compact disc player, or virtually any other like electrical device if so desired. Also, the apparatus 200 is lightweight enough that it could even be secured by a VELCRO* like fastener to an independent portable radio frequency receiver, cassette tape player, or compact disc player if so desired.

In the preferred embodiments 10 and 200, the invention has a thickness of approximately one inch and an outer diameter, excluding ear portions 18 and 20 and electrical coupling assembly 228, of approximately two to three inches. Accordingly, the embodiments 10 and 200 form extremely compact, easily handled, stored and transported assemblies.

The various embodiments of the present invention significantly enhance the enjoyment of many exercise and leisure activities such as bicycling, walking, jogging, hiking, and cross-country skiing, etc., where it is desirable to listen to music, news reports, or other broadcast information while such activities are being performed. The neat, efficient and quick manner in which the conductors 38 and 40, or 210 and 212, may be stored within the respective housings and quickly and easily unwound therefrom further adds to the ease and enjoyment of using the various embodiments of the present invention.

While the above description constitutes the preferred embodiments of the invention, it will be appreciated that the invention is susceptible to modification, variation, and change without departing from the proper scope or fair meaning of the accompanying claims.

What is claimed is:

1. A compact, portable FM stereo receiver apparatus, said apparatus comprising:

independent left and right earphone transducers;

a generally circular spindle housing section, said spindle housing section including means for housing independent left and right earphone transducers;

a generally circular ratchet housing section operable to cooperatively couple with said spindle housing section, said ratchet housing section and said spindle housing section when coupled together forming means protruding therefrom for independently, removably housing said left and right earphone transducers;

a spool rotatably mounted within said ratchet and spindle housing sections;

independent left and right channel conductors electrically coupled to said earphone transducers and woundably disposed upon said spool, and operable to be manually unwound from said spool through an opening with at least one of said ratchet and spindle housing sections by a user of said apparatus;

a flat coil spring operatively associated with said spindle housing section and said spool for generating a constant biasing force to constantly urge said spool in a rewind direction;

a ratchet arm operatively associated with said ratchet housing section for maintaining said spool stationary against said biasing force generated by said flat coil spring after said left and right channel conductors have been unwound by a user an approximate, desired length outwardly of said apparatus;

pushbutton release means operatively associated with said ratchet arm for urging said ratchet arm outwardly of said spool to enable said biasing force generated by said flat coil spring to windably rotate said spool in said rewind direction, thereby rewinding said left and right channel conductors upon said spool;

an FM stereo receiver disposed within said ratchet and spindle housing sections and operatively associated with said independent left and right channel conductors; and a removable battery for powering said FM stereo receiver and wherein said spool comprises a central wall portion having a plurality of tab members protruding therefrom; and wherein said ratchet arm is operable to ride over said tab portions without interrupting rotating movement of said spool when said left and right channel conductors are manually unwound from said spool, said elongated ratchet arm being operable to abuttingly engage at least one of said tab members when said spool is rotatably urged in said rewind direction by said biasing force from said flat coil spring, to thereby maintain said spool stationary after said left and right channel conductors have been unwound from said spool an approximate, desired length.

* * * * *